United States Patent [19]

Wockener

[11] 3,964,848

[45] June 22, 1976

[54] CALENDERING OF SYNTHETIC PLASTICS FILM

[75] Inventor: Willi Wockener, Hannover-Kleefeld, Germany

[73] Assignee: Hermann Berstorff Maschinenbau GmbH, Hannover-Kleefeld, Germany

[22] Filed: Sept. 13, 1974

[21] Appl. No.: 505,913

[30] Foreign Application Priority Data

Sept. 15, 1973   Germany........................... 2346543

[52] U.S. Cl.................................... 425/224; 72/160; 164/282; 264/76; 264/175; 425/335; 425/DIG. 235
[51] Int. Cl.²............................................ B29D 7/14
[58] Field of Search ............ 425/194, 235, 363, 366, 425/224, 335, DIG. 235; 164/282; 72/160, 162, 274, 8; 264/75, 76, 175

[56] References Cited

UNITED STATES PATENTS

| | | | |
|---|---|---|---|
| 2,258,659 | 10/1941 | Mosler, Jr. | 425/DIG. 235 |
| 2,277,313 | 3/1942 | Fowler | 425/194 |
| 3,007,207 | 11/1961 | Salhofer | 264/175 |
| 3,366,992 | 2/1968 | Seanor et al. | 425/363 |
| 3,499,957 | 3/1970 | Ancker | 425/363 |
| 3,566,638 | 3/1971 | Herbst | 72/21 |
| 3,570,288 | 3/1971 | Fischer | 72/21 |
| 3,578,766 | 5/1971 | Diolot | 100/170 |
| 3,587,267 | 6/1971 | Townsend | 72/21 |

*Primary Examiner*—Francis S. Husar
*Assistant Examiner*—Robert J. Charvat
*Attorney, Agent, or Firm*—Donald D. Jeffery

[57] ABSTRACT

A method of and calender for calendering synthetic plastics film, particularly PVC film, wherein the total roller looping distance of the film around the rolls of the calender is reduced having regard to known five-roll calenders by providing that the material to form the film is fed into a roller gap between a first roller and a third roller, with the first roller set at the same height as the third roller, the film is looped around the third roller for three quarters of the circumference thereof and, during such looping, passes through a second roller gap between the third roller and a second roller disposed beneath the third roller and through a third roller gap between the third roller and a fourth roller disposed above the third roller, the film then being looped around the fourth roller for three quarters of the circumference thereof and, during such looping, passes through a fourth roller gap between the fourth roller and the fifth roller mounted above the fourth roller, the calendered film then being pulled off from the fourth roller.

2 Claims, 4 Drawing Figures

CALENDERING OF SYNTHETIC PLASTICS FILM

The invention concerns improvements relating to calendering of synthetic plastics film, particularly PVC film.

High-temperature films of S-PVC (suspension PVC) can be produced on a calender at a temperature of 180° to 220°C. Such synthetic plastics films contain relatively large amounts of stabilisers to avoid thermal decomposition during calendering at such high temperatures and are used principally as packaging material. Low-temperature films of E-PVC (emulsion PVC) can be produced at approximately 150° to 180°C.

In comparison with the PVC, the price of stabilisers is very high. However, since within certain temperature ranges PVC is best processed on a calender, it is vital to add relatively large amounts of stabilisers to the PVC.

S-PVC has been previously processed into film on a five-roll-L-calender. The material undergoes its first loading in the gap between a first roller and a second roller and then in the three roller gaps following the first gap (it is generally usual to number calender rolls in the direction in which the material passes through them). As this happens, the S-PVC film drawn in the first roller gap is looped three-quarters around the second roller, two-quarters around the third roller, two-quarters around the fourth roller and again three-quarters around the fifth roller. Thus, there is a total looping amounting to two and a half times the circumference of one of the cylinder rollers.

Since the individual calender rollers have to be heated to approximately 220°C in order to achieve a temperature of approximately 220°C at which the S-PVC is processed, then according to the state of the art, the S-PVC must contain a correspondingly high proportion of stabilisers. Without a correspondingly high proportion of stabilisers, the S-PVC would be thermally overloaded during this long total roller looping time around the individual calender rollers, i.e. it would burn.

It is therefore important to discover and maintain the correct processing temperature both for S-PVC and for E-PVC, the dwell time of the PVC in the calender, i.e. on the individual rollers, being as short as possible. Naturally, the quality of the film produced in this way should not suffer in consequence. The more roller gaps a produced film traverses, then generally the better is the quality of the film. For this reason, also, a five-roll calender is used because this has four working gaps.

Thus, the problem on which the invention is based resides in lowering the very expensive stabiliser content in the PVC during the processing of films by shortening the total distance over which the PVC is looped around the rollers as it passes through a five-roll calender, the material nevertheless traversing the four roller gaps necessary for a high-quality film.

In order to optimise the production of PVC films, it was necessary to keep the price of the raw material to be processed as low as possible and on the other hand, to provide a calender construction with which this raw material can be outstandingly processed and which is moreover capable of being constructed at a favourable cost.

The solution according to the invention is therefore characterised by a new manufacturing process and a new construction of calender. Particularly important was the question of keeping as short as possible the total distance over which the film to be produced is looped around the rollers within the five-roll calender, i.e. it was particularly important for the film to stay on one roller for as long as possible in order to create favourable conditions for temperature transference. On the other hand, the total time for which the film was looped around the rollers of the calender had to be kept as short as possible.

According to one aspect of the invention there is provided a method of calendering synthetic plastics film on a five-roll calender, comprising the steps of drawing the synthetic plastics film through a first working roller gap of the five-roll calender; looping it around three-quarters of the circumference of a third roller and around three-quarters of the circumference of a fourth roller, in a manner such that the film passes through three further working roller gaps during the looping; and pulling it off the calender.

According to another aspect of the invention there is provided a five-roll calender for calendering synthetic plastics film in which a third roller of the five-roll calender forms three working roller gaps by co-operating with a laterally preceding first roller set at the same height as the third roller, with a second roller disposed beneath the third roller and with a fourth roller disposed above the third roller, and the fourth roller forms a fourth roller gap by co-operating with a fifth roller.

A calender construction which is thus designed makes it possible for the synthetic plastics film to be produced to be looped within the five-roll calender only around two rollers, and then by three-quarters of their circumference each. This double three-quarter looping around the third and fourth rollers ensures in outstanding fashion that the processing temperature required for the film is transferred from the third and fourth rollers to the film looped around the rollers without the film being overheated during its production in a five-roll calender by spending too long a total time on the individual rollers.

The advantages of the manufacturing method according to the invention reside therefore first and foremost in the short total looping within the five-roll calender, achieving a very favourable temperature loading, particularly in the case of high-temperature films, without too much stabiliser having to be added to the PVC.

The longer the total looping distance of the film within a calender, the more however the film becomes heated so that parts of the stabilisers and of the softeners gasify and form tiny bubbles within the film. But also the humidity in the PVC itself results in bubble formation if the film is intensely heated for a prolonged period. For this reason, it is of vital importance to the manufacture of a high-quality PVC film to keep the total dwell time of the films on the surfaces of the rollers in the five-calender roll as short as possible in order to reduce or even prevent the formation of bubbles.

But also the calender construction for carrying out the method according to the invention offers various advantages.

The invention is diagrammatically illustrated by way of example with accompanying drawings, in which FIG. 1 shows a five-roll calender of known kind, the total distance of looping of film around the rollers amounting to two and a half times the circumference of a roller;

Figure 1:
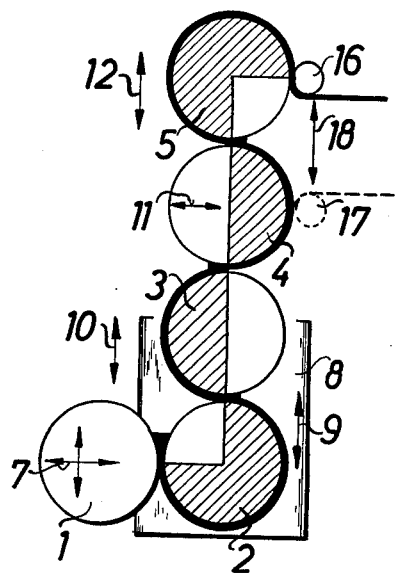

FIG. 1 shows a five-roll calender formed by rolls numbered 1 to 5. An oblique setting of the roller 2 is not possible because the roller 1 is disposed alongside the roller 2. Thus, only a roller counter-bending arrangement could be used as a means of compensating for any sag in the roller 2. However, since calender rollers can only be flexed by a counter-bending arrangement over a small range, then in addition to the counter-bending arrangement, the roller 2 should also be given a convex shaping. Calenders with convex rollers however have the great disadvantage that they can only be used for the processing of quite specific material. If there is any great variation in the viscosity of the material to be processed, different pressures arise in the roller gaps, so that it is necessary also to work with a differently convexly-shaped roller. For this reason, it must be regarded as extremely disadvantageous to provide rollers with a different convex shaping because the use of the calender is thereby restricted to an unjustifiable degree.

In the case of the conventional construction, as shown in FIG. 1, it is necessary furthermore to set the roller 4 obliquely to compensate for the curvature of the roller 5. This has the disadvantage that the oblique positioning of the roller 4 also affects the roller gap between the rollers 3 and 4, which is disadvantageous because too much material is conveyed out of the edges of the gap between the rollers 3 and 4 which widens out during the oblique positioning, to the gap between the rollers 4 and 5. Thus, there are disadvantages to the process because no regular pug is formed in the last roller gap, i.e. the film produced is thicker at the edges than it is in the middle.

Figure 3:
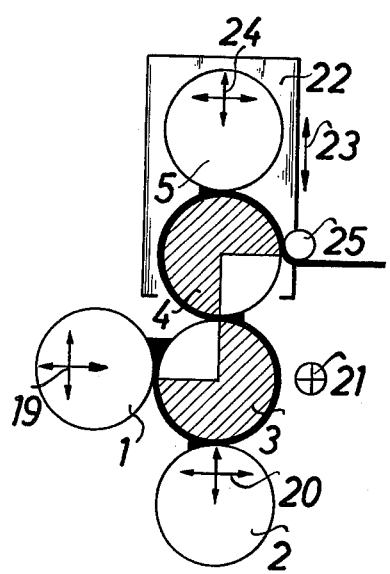
FIG. 3 shows a five-roll calender according to the present invention with a total looping around the rollers of one and a half times the circumference of a roller.
Figure 4:
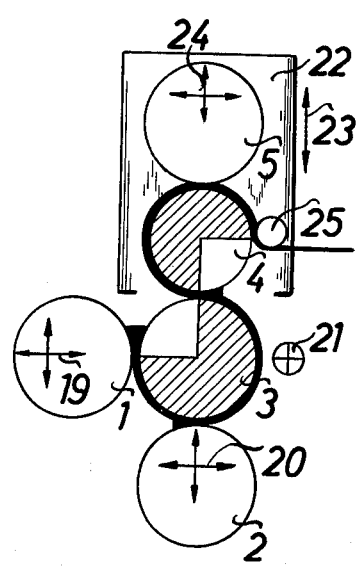
FIG. 4 shows a calender constructed according to the invention, and utilising the working and supporting roller principle.

In the case of the disposition of rollers according to the invention and as shown in FIGS. 3 and 4, it is not the roller 4 but the roller 5 which is set obliquely and thus an excellent parallel final roller gap can be obtained which is important having regard to the surface of the film and its quality.

Figure 2:
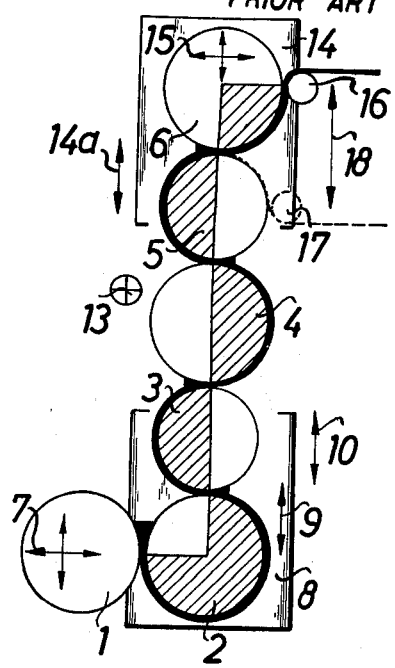
FIG. 2 shows a six-roll calender of known kind which operates on the working and supporting roller principle, with a total looping around rollers of two and a half times a roller circumference.

The calender construction according to the invention is particularly suitable when working and supporting rollers are used. FIG. 2 of the drawings shows that when working rollers 3 and 5 are used, it is necessary to provide supporting rollers 2, 4 and 6 to obtain the correct balancing forces. The roller 1 is needed to form the in-feed gap.

If the calender construction shown in FIG. 2 is replaced by a calender construction according to the invention, as shown in FIG. 4, it is possible to economise on one working roller, i.e. provide one roller, the roller 4, of smaller diameter.

When smaller-diameter rollers are used, these have to be supported by rollers of larger diameter so that the deflection conditions of the rollers are kept symmetrical.

Since in the case of the calender of FIG. 4, the roller 4 is supported by the rollers 3 and 5, there are four working gaps and the roller 1 provides an in-feed gap, thereby giving an advantage if it is desired to work on the calender principle utilising working and supporting rollers.

If a five-roll calender of known kind and as shown in FIG. 1, is to be used as a four-roll calender, the roller 5 is raised and the pull-off arrangement is moved down to operate with the roller 4. However, lowering the pull-off arrangement and the successive arrangements which are connected to the pull-off arrangement requires an extremely high outlay on equipment. Also since the roller 4 is set obliquely, it is necessary to pull-off from an obliquely-positioned roller, thereby causing a one-sided stretching of the pulled-off film.

If the calender of FIG. 3, is used as a four-roll calender, then the roller 2 is moved down so that the gap between the rollers 3 and 2 is eliminated. Since the pull-off arrangement is disposed on the roller 4, there is no need to move the pull-off arrangement if the apparatus is converted in this way. The completely calendered film is nevertheless pulled off from a straight roller, in other words it is not stretched on one side as is the case when pulling off roller 4 on calenders according to the state of the art.

The double arrows 7 indicate that the roller 1 can be mounted both parallel and also obliquely. FIGS. 1 and 2 both show a slide block 8 which, together with another slide block on the other side of the calender, house the roller journals and journal bearings.

The slide block 8 can be raised and lowered in the direction of arrow 10. Arrow 9 indicates that the roller 2 can be raised and lowered within the slide block 8 in order to adjust the roller gap between the rollers 2 and 3. Horizontal arrow 11 in FIG. 1 indicates that the roller 4 can be obliquely positioned. Vertical arrow 12 indicates that the roller 5 can be set parallel.

The pictograph marked 13 indicates that the roller 4 in FIG. 2 is a fixed roller. The rollers 5 and 6 are mounted at their ends in slide blocks 14 in the embodiment of FIG. 2, the slide blocks 14 being capable of being raised and lowered as indicated by arrow 14a. Double arrow 15 indicates the parallel and oblique setting of the roller 6 in FIG. 2. By means of a pull-off arrangement 16, completely calendered film can be pulled off the calender. The pull-off arrangement 16 can be moved in the direction of arrow 18 as far as the roller 5 in FIG. 2 and roller 4 in FIG. 1, as indicated in dotted lines at 17.

In the case of the calender construction shown in FIGS. 3 and 4 of the drawings, double arrow 19 indicates the directions of parallel and oblique movement of the roller 1 and double arrow 20 represents the parallel and oblique settings of the roller 2. The roller 3 is a fixed roller as indicated by the pictograph marked 21. The bearings (not shown) for the roller journals of rollers 4 and 5 rest on both sides in slide blocks 22 which can be raised or lowered as indicated by arrow 23 for adjustment of the roller gap between the rollers 3 and 4. Double arrows 24 indicate the parallel and oblique adjustability of the rollers 5.

Since both parallel and also oblique adjustments are readily known to a man skilled in the art, there will be no more detailed explanation of these arrangements.

By means of a pull-off roller 25 disposed alongside the roller 4, the completely calendered film can be pulled off the calender and passed to further processing means.

In order to identify the looping path of the films drawn on the calender, the looping path of the drawn film around the rollers is indicated by the shaded portions. This shading on the rollers makes it readily obvious that the distance over which the film is looped around the rollers, as indicated in FIGS. 3 and 4, regarded in toto, is substantially shorter than the distance through which it is looped around rollers in the calender constructions of known kind shown in FIGS. 1 and 2.

Since the roller 1 of FIGS. 3 and 4 is disposed alongside the roller 3, the roller 3 forms three working gaps together with rollers 1, 2 and 4. Such a disposition of rollers makes it possible for the synthetic plastics film drawn in the first roller gap of a five-roll calender to be looped around three-quarters of the circumference of the roller 3 and three-quarters of the circumference of the roller 4, during which looping, it passes through four working gaps after which it is pulled off the calender.

When the calender construction according to the invention is used as a working and supporting roller calender, i.e. when a roller of smaller diameter is supported by two rollers of larger diameter, the following substantial advantages result.

Despite the fact that the roller 4 in FIG. 4 is a working roller of relatively small diameter, the balance of forces and pressure is maintained, i.e. the roller 4 is supported on both sides by a roller of larger diameter. Despite the very advantageous use of working and supporting rollers, therefore, in the case of a calender construction according to the invention, which is shown in FIG. 4, a working roller of smaller diameter is rendered unnecessary, as is particularly demonstrated by a comparison of the two drawings in FIGS. 2 and 4, so that nevertheless a symmetrical deflection or loading of the roller 4 is maintained. In the case of the calender according to FIG. 2, it is true that an additional working gap is obtained. On the other hand, it is normally quite sufficient for the material which is to be processed to pass through four working gaps, the fifth working gap such as is obtained in the case of the calender according to FIG. 2 is thus dispensible.

In addition to the oblique positioning of the roller 5 in the case of the calender construction according to the invention, a counter-bending arrangement is advantageously provided on the roller 5.

The term counter-bending arrangement is to be understood as denoting an arrangement which acts on the roller journals outside of the calender stands, bending these in the opposite direction, so creating a compensatory deflection. Such counter-bending arrangements are well known to persons skilled in the art.

Since the PVC films produced on the calender according to the invention can have, in their width, thickness tolerances of only a few microns the rollers 2 and 4 of the calender according to the invention are preferably pre-tensed. This can be effected by large hydraulic rams which act on the outside of the calender stands and on the roller journals and urge the roller journals in a definite direction in the roller bearings. Pre-tensing arrangements maintain the calender roller firmly in its working position, i.e. the roller cannot float.

What is claimed is:

1. In a five-roll calendar for calendering synthetic plastics film an arrangement of said five-rolls such that a third calender roller of said five-roll calender co-operates with a laterally preceding first calender roller, set at the same height as said third calender roller, to form a first working roller gap, and cooperates with a second calender roller disposed beneath said third calender roller to form a second working roller gap, and cooperates with a fourth calender roller disposed above said third calender roller to form a third working roller gap, and said fourth calender roller co-operates with a fifth calender roller to form a fourth roller gap, a pull-off roller cooperating with said fourth calender roller to form a fifth roller gap located three-quarters of the circumference of said fourth calender roller from said third roller gap, the arrangement being such that said film is looped around three-quarters of the circumference of said third calender roller and three-quarters of the circumference of said fourth calender roller before being pulled off said fourth roller.

2. The calender of claim 1, wherein said fourth calender roller of said five-roll calender is of smaller diameter than the other four calender rollers.

* * * * *